Oct. 26, 1965   T. V. WILLIAMS   3,213,516
CUTTING TOOL
Filed Dec. 18, 1963

INVENTOR.
Thurston V. Williams
BY
Roberts, Cushman & Grover
ATT'YS

United States Patent Office 3,213,516
Patented Oct. 26, 1965

3,213,516
CUTTING TOOL
Thurston V. Williams, Wilton, N.H., assignor to The O.K. Tool Company, Inc., Milford, N.H., a corporation of New Hampshire
Filed Dec. 18, 1963, Ser. No. 331,465
3 Claims. (Cl. 29—105)

This invention relates to cutting tools such as milling cutters and the like and more particularly to tools in which the rotary head or other blade carrier has a recess to receive a blade, the recess being defined by a bottom and opposed sides and having a mouth opposite the bottom through which a blade may be inserted into the recess, the blade and recess being similarly tapered from the mouth toward the bottom so that, when driven into the recess, the blade wedges in place. To hold the blade against sidewise movement it is customary to provide serrations or other key means on one of the aforesaid opposed sides of the recess. With commercial tools it is not practicable to cut the serrations all the way to the bottom of the recess. Consequently there is waste space between the inner end of the blade and the bottom of the recess. Furthermore it is usual for the serrating tools to leave a machined burr at this point which must be removed by an additional operation. To avoid this objectionable condition it has been proposed to undercut this serrated side of the recess by means of drilling prior to machining the recess, or alternately, machine an undercut after the recess is machined. However, either expedient requires an extra operation which this invention eliminates.

Objects of the present invention are to permit a tapered serrated blade to extend substantially to the bottom of the recess and at the same time permit the entire recess to be cut in a single operation without the aforesaid separate undercutting operation.

According to this invention the outer portion of one side of the recess adjacent said mouth is inclined relatively to the opposed side so that the recess tapers inwardly, said one side of the recess and the opposed face of the blade being keyed together by key means extending transversely of said bottom, the key means extending throughout the length of said inclined portion and terminating short of said bottom, and the inner portion of said one side adjacent said bottom being more nearly parallel to said opposed side than said outer portion but not inclining away from the opposed side so that the entire recess may be cut with a milling cutter. Preferably said inner portion is substantially parallel to said opposed side.

Figure 1:
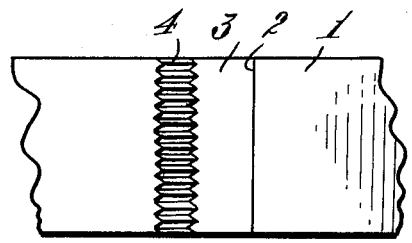
Figure 2:
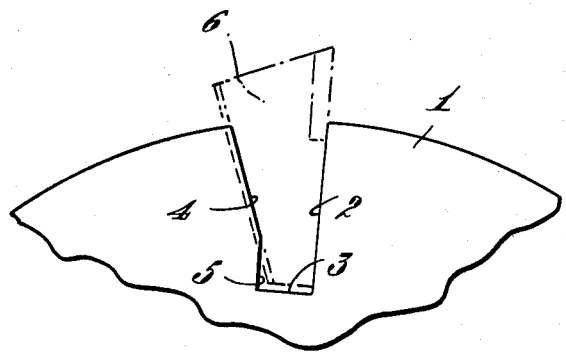

For the purpose of illustration a typical embodiment of the invention is shown in the accompanying drawings in which FIG. 1 is a peripheral view of a rotary cutter with the blade removed; and FIG. 2 is a side view of the tool with a blade in place.

The particular embodiment of the invention chosen for the purpose of illustration comprises a rotary carrier 1 having blade recesses distributed around its periphery, each recess comprising a forward side 2, a bottom 3 and a rearward side comprising an outer portion 4 and an inner portion 5. The outer portion 4 is inclined relatively to the forward side 2 so that the outer portion of the recess tapers inwardly, the inner portion 5 of the rearward side being substantially parallel with the forward side 2. The blade 6 is tapered the same as the recess so that, when driven in through the mouth of the recess, it wedges in place. The outer portion 4 of the rearward side of the recess and the opposed face of the bit are serrated to prevent lateral movement of the blade. The depth of the inner portion 5 of the rearward side of the recess has sufficient depth to permit the formation of the serrations on the outer portion 4 throughout its full length. Thus the blade 6 may extend substantially to the bottom of the recess, and the recess may be cut in a single operation by a milling cutter having the same cross-sectional shape as the recess.

It should be understood that the present disclosure is for the purpose of illustration only and that this invention includes all modifications and equivalents which fall within the scope of the appended claims.

I claim:
1. A cutting tool comprising a carrier having a bit recess defined by a bottom and two opposed sides, the recess having a mouth opposite said bottom through which a blade may be inserted into the recess, and a tapered blade wedged in the recess with its outer end projecting from said mouth, the outer portion of one of said sides adjacent said mouth being inclined relatively to the opposed side so that the recess tapers inwardly, said one side of the recess and the opposed face of the bit being keyed together by key means extending transversely of said bottom, the key means including a keyway extending throughout the length of said inclined portion and terminating short of said bottom, and the inner portion of said one side adjacent said bottom being more nearly parallel to said opposed side than said outer portion but not inclining away from the opposed side so that the entire recess may be cut with a milling cutter and said keyway may then be cut throughout the full length of said outer portion.
2. A cutting tool according to claim 1 wherein said inner portion is substantially parallel to said opposed side.
3. A cutting tool according to claim 1 wherein said key means comprises serrations.

References Cited by the Examiner
FOREIGN PATENTS
755,847    8/56    Great Britain.

WILLIAM W. DYER, JR., Primary Examiner.